May 5, 1942.  E. BABBIN  2,282,152
DOUBLE ACTION SHOWER MIXING VALVE
Filed June 7, 1940  2 Sheets-Sheet 1
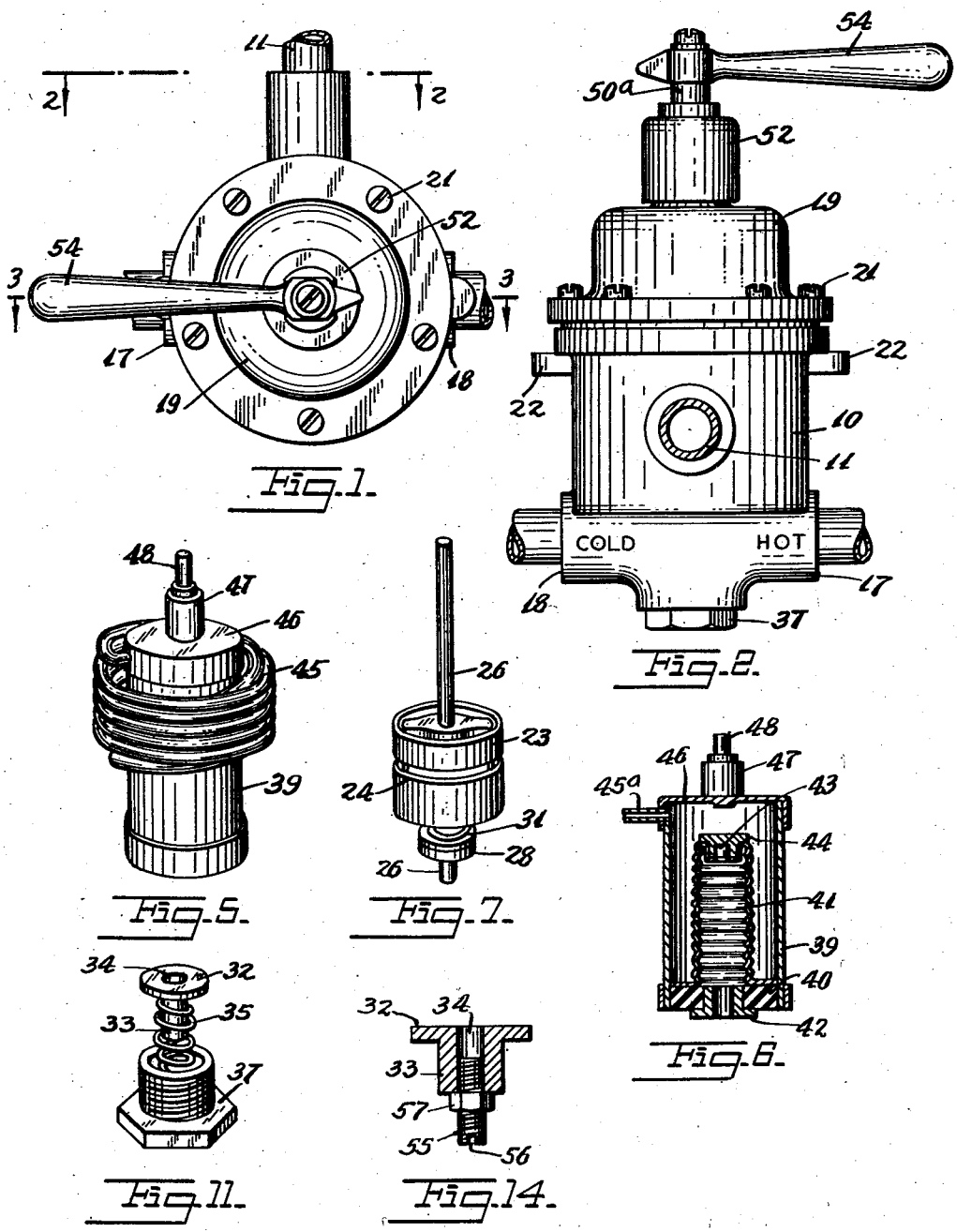

May 5, 1942.  E. BABBIN  2,282,152
DOUBLE ACTION SHOWER MIXING VALVE
Filed June 7, 1940  2 Sheets-Sheet 2
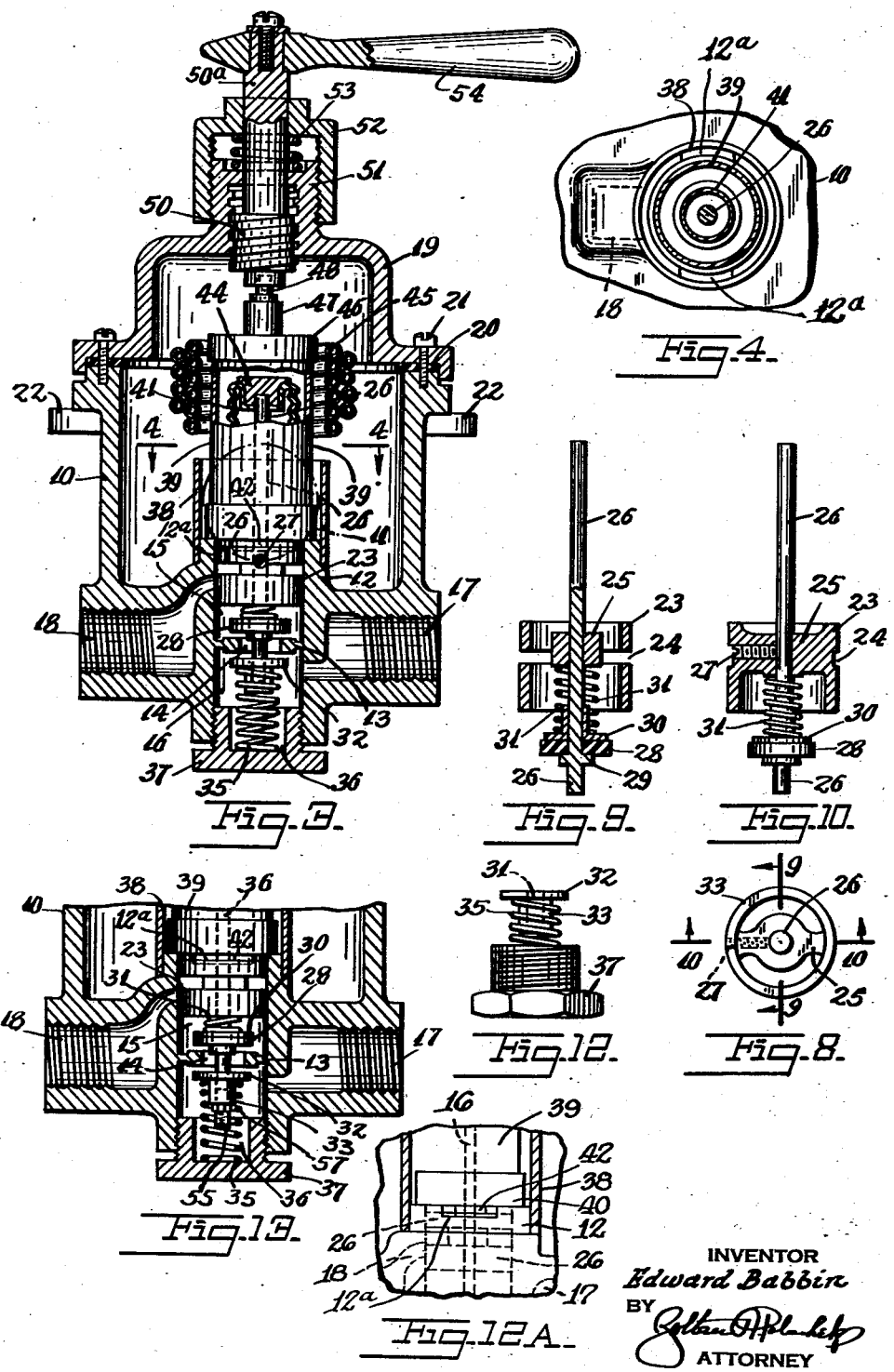
INVENTOR
*Edward Babbin*
BY
ATTORNEY

Patented May 5, 1942

2,282,152

UNITED STATES PATENT OFFICE 2,282,152

DOUBLE ACTION SHOWER MIXING VALVE

Edward Babbin, New York, N. Y.

Application June 7, 1940, Serial No. 339,234

3 Claims. (Cl. 236—12)

This invention relates to new and useful improvements in a double action shower mixing valve.

The invention proposes the construction of a mixing valve as mentioned which is capable of uniformly mixing hot and cold water and controlling the discharge of the mixed water in a manner so that the temperature is uniform.

Still further the invention contemplates so constructing the mixing valve that in the event the thermostat control thereof breaks or is damaged, the mixing valve will be automatically closed.

Another object of the invention resides in a specific arrangement of valve heads within the mixing valve operating in a certain way to obtain the desired results.

Still further the invention proposes an arrangement whereby the quantity of mixed water discharging from the mixing valve may be controlled in addition to its temperature.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a plan view of a double action shower mixing valve constructed according to this invention.

Fig. 2 is a sectional view taken on the line 2—2 of Fig. 1.

Fig. 3 is a vertical sectional view taken on the line 3—3 of Fig. 1.

Fig. 4 is a fragmentary horizontal sectional view taken on the line 4—4 of Fig. 3.

Fig. 5 is a perspective view of the thermostat of the mixing valve.

Fig. 6 is a vertical sectional view of Fig. 5.

Fig. 7 is a perspective view of certain valves used in the mixing valve.

Fig. 8 is a plan view of Fig. 7.

Fig. 9 is a vertical sectional view taken on the line 9—9 of Fig. 8.

Fig. 10 is a fragmentary vertical sectional view taken on the line 10—10 of Fig. 8.

Fig. 11 is a perspective view of another one of the valves and associated parts used in the mixing valve.

Fig. 12 is a side elevational view of Fig. 11.

Fig. 12A is a view similar to a portion of Fig. 3, but with certain of the parts in elevation.

Fig. 13 is a fragmentary vertical sectional view of a mixing valve constructed in accordance with a modification of this invention.

Fig. 14 is an enlarged vertical sectional view of a certain valve head illustrated in Fig. 13.

The double action shower mixing valve, in accordance with this invention, includes a hollow body 10 provided with an outlet 11 and having an internal cylindrical portion 12 extending inwards from one side of the hollow body. This cylindrical portion 12 is provided with a transverse partition 13 having a passage 14 dividing it into connected upper and lower compartments 15 and 16 respectively. A hot water inlet 17 connects with the compartment 16. A cold water inlet 18 connects with the compartment 15.

The body 10 is substantially of cylindrical form. The top of the body is closed with a head member 19. A gasket 20 is interposed between the head member 19 and top of the body 10. A plurality of fastening elements 21 secure these parts together. A pair of diametrically opposite lugs 22 project from the body 10 providing elements by which the body may be gripped and held.

A cylindrical valve 23 is slidably mounted in the cylindrical portion 12 and controls the water inlet 18 to the upper compartment 15. The cylindrical body of the valve 23 has a peripheral cutout 24 through which the water may pass when this cutout is aligned with the discharge port of the inlet 18. The valve 23 has a web portion 25 through which a valve stem 26 is extended. This valve stem is fixedly held in position by a set screw 27 which threadedly engages through the web portion 25 and abuts the stem 26. The stem 26 projects from the top and from the bottom of the valve 23.

A valve 28 is disposed above the partition 13 and is mounted on the bottom portion of the stem 26 and controls the passage 14 through the partition 13. This valve 28 is slidably mounted on the stem 26 and normally rests on a flange 29 formed or mounted on the stem 26. A bushing 30 is coaxially mounted on the stem 26 above the valve 28. A spring 31 is coaxially mounted on the stem 26 and acts between the bushing 30 and the web 25 for normally urging the valve 28 down upon the flange 29.

A valve 32 is arranged below the partition 13 and is controlled by the bottom end of the stem 26 and controls said passage 14 in the partition 13. This valve 32 has a stem 33 projecting from its bottom side. The valve 32 and stem 33 is formed with a central opening 34 into which the bottom end of the stem 26 extends. The valve 32 is supported by a spring 35 which coaxially engages about the stem 33. This spring 35 extends downward into a cavity 36 of a nut 37 which is removably mounted on the bottom end of the cylindrical portion 12.

A short tube 38 is mounted on the top of the cylindrical portion 12 and acts as a baffle to direct the water discharging upward through the cylindrical portion 12 against the thermostat of the device. This thermostat includes a cylindrical body 39, the bottom end of which extends into the tube 38 and rests on the top of the cylindrical portion 12. The top of the cylindrical portion 12 on diametrically opposite sides is formed with cutout portions 12$^a$ which permits the water to pass around the bottom end of the thermostat body 39 to discharge from the compartment 15 into the body 10. The cylindrical body 39 has its bottom end closed with an annular member 40. A pair of bellows 41 is mounted on this annular member 40 and extends upward into the cylindrical body 39. A bushing 42 is mounted upon the bottom end of the bellows 40 and comprises a guide through which the stem 26 slidably passes. The stem 26 extends upward through the bellows and engages within an opening 43 formed in a top cap 44 mounted on the top of the bellows.

A tube 45 has one end 45$^a$ connected with the cylindrical body 39 and is coiled about the body and has its other end sealed. Suitable expansion gases or a liquid is sealed into the compass of the tube 45 and cylindrical body 39. The top of the cylindrical body 39 is closed with a cap 46. This cap supports a bushing 47 from which a top peg 48 projects.

The peg 48 engages into a receiving opening formed in the bottom end of a screw 50. This screw is associated with means for controlling the operation of the thermostat. The screw 50 is threadedly engaged through a boss 51 formed on the top of the head member 49. A cap 52 threadedly engages over the boss 51. A spring 53 is mounted within the cap 52 coaxially of the stem 50$^a$ of the screw which extends upward out through the cap. The spring 53 functions to prevent the cap 52 from working loose. A handle 54 is mounted upon the outer end of the screw stem 50$^a$ by which the screw 50 may be turned.

The operation of the device is as follows:

With the parts as illustrated in Fig. 3 hot water which enters through the inlet 17 will pass up through the passage 14 and through the center of the valve 23 and upward into the body 10. If the temperature of this water rises the liquid or material within the thermostat will expand and force the bellows 41 downward. This moves the valve stem 26 downward. Since the valve 23 is mounted on the stem 26 it moves downward and thus cold water from the inlet 18 may now pass through the groove 24 of the valve 23 and mix with the hot water. Simultaneously, as the valve stem 26 moves downward the valve 28 will move closer to its seat on the partition 13, thus acting to cut down the supply of hot water. In this fashion a regulated mixed water supply will discharge into the body 10 and out from the outlet 11.

The valve 28 is provided for closing the passage 14 through the partition 13 when the cold water supply is reduced or shut off entirely, since the excessive heat would move the stem 26 downward and force the valve 28 against the seat at the top of the partition 13.

The handle 54 may be turned to cause the screw 50 to move downward or upward as desired. This will change the position of the thermostat, which in turn will change the position of the valve stem 26. This change indirectly affects the temperature of the discharging water. If the valve stem 26 is in a lower position for the same temperature of the thermostat the valve 23 will be correspondingly lower and cold water will be passing through the valve 23 mixing with the hot water which is passing up through the passage 14.

In the event that the thermostat is broken or damaged, and thus inoperative, or the hot water supply should fail, the spring 35 will immediately expand and move the valve stem 26 upward. The valve 32 then engages against its seat on the bottom of the partition 13 closing the passage of hot water through the passage 14. This prevents scalding water from being discharged by the mixing valve. Upward motion of the stem 26 will also cause the valve 23 to close the passage of cold water. Thus when the thermostat is damaged, the discharge of water will be automatically cut off.

In Figs. 13 and 14 a modified form of the invention has been disclosed which distinguishes from the prior form in the fact that means has been provided for holding the valves 32 and 28 in selected relative positions for controlling the quantity of water passing through the mixing valve. More specifically, the stem 33 of the valve 32 has an adjustment screw 55 which is threadedly engaged into its bottom end, and which extends upward and forms the bottom of the opening 34 into which the valve stem 26 engages. The screw 55 has a cut 56 in its bottom end into which a screw driver may be engaged for turning the same. A lock nut 57 is mounted on the screw 55 to hold it in adjusted positions.

It is necessary that the cap 37, the spring 35, and the valve 32 be removed before it is possible to adjust the screw 55. A change of the relative positions of the valves 32 and 28 will control the initial passage of hot water through the passage 14 with the valve 23 in its closed position.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a hot and cold water mixing shower valve, a hollow body for the mixed hot and cold water, an internal cylindrical portion formed in one end of said body and having a transverse partition having a passage and dividing said cylindrical portion into connected upper and lower compartments, a hot water inlet to one of said compartments, a cold water inlet to the other of said compartments, a cylindrical valve in the upper compartment of said cylindrical portion and movable upwards to close said water inlet to said upper compartment and movable downwards to open said water inlet to said upper compartment, a valve stem having an intermediate portion securely attached to said cylindrical valve and having its free ends projected upward and downward through said passage, a valve fixedly mounted on the downward extending end of said valve above said partition in a position to seat on the top face of said partition over said passage when said cylindrical valve is in its open position to control the passage of water from said lower to said upper compartment, resilient means operating between the bottom end of said valve stem and adjacent portion of said body urging said valve stem upward to correspondingly move said valves and open one and close the other, an expanded thermostat mounted within said body and engaging the top end of said valve stem urging it downward against the holding action of said resilient means and correspondingly move said valves to open the closed one and close the open one, whereas if said thermostat breaks and collapses it will free said valve stem to be urged completely upwards by said resilient means, and a third valve fixedly mounted on the downwardly extending end of said valve stem below said partition in a normally inoperative position, whereby when said thermostat becomes inoperative and frees said valve stem said spring will urge said valve stem upwards to seat said third valve on the bottom face of said partition over said passage to prevent the passage of water therethrough and arrest further upward movement of said valve stem and simultaneously move said cylindrical valve upward to close the water inlet to said upper compartment.

2. In a hot and cold mixing shower valve as described in claim 1 the addition of means for holding said third valve in various adjusted positions on the bottom end of said valve stem so that said third valve may be properly positioned to remain inoperative during normal operation of said valve.

3. In a hot and cold mixing shower valve as described in claim 1 the addition of means for holding said third valve in various adjusted positions on the bottom end of said valve stem so that said third valve may be properly positioned to remain inoperative during normal operation of said valve, said latter-mentioned means, comprising a downward extending cup-shaped projection formed on said third valve and into which the bottom end of said valve stem extends, and a screw threadedly extended through the bottom wall of said cup-shaped projection and having its top end abutting the bottom end of said valve stem to move said third valve relative to said valve stem and partition as said screw is turned.

EDWARD BABBIN.